June 30, 1942.  T. ZUSCHLAG  2,288,310
APPARATUS FOR GEO-ELECTRIC AND SEISMIC INVESTIGATIONS
Filed April 23, 1938
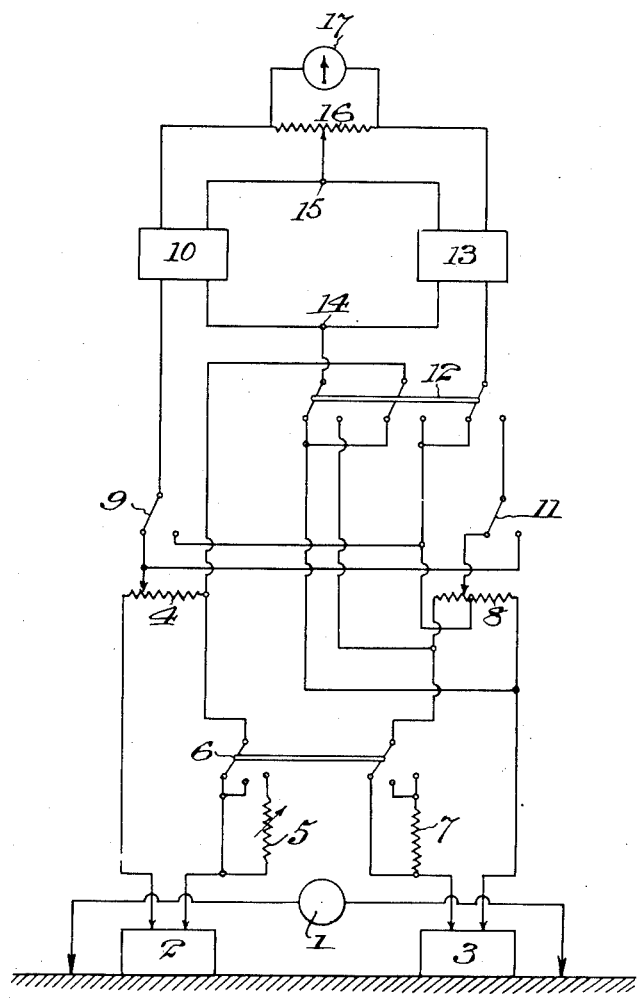
INVENTOR
Theodor Zuschlag
BY
his ATTORNEYS Patented June 30, 1942

2,288,310

UNITED STATES PATENT OFFICE 2,288,310

APPARATUS FOR GEOELECTRIC AND SEISMIC INVESTIGATIONS

Theodor Zuschlag, West Englewood, N. J., assignor, by mesne assignments, to Lundberg Exploration S. A., Panama City, Panama, a corporation of Panama Application April 23, 1938, Serial No. 203,830

4 Claims. (Cl. 172—245)

This invention relates to apparatus and method for geo-electric and seismic investigations useful in geological prospecting, and is directed more particularly to the construction and use of an apparatus for determining the absolute amplitude ratio and phase difference of sine wave electromotive forces of the same frequency. The apparatus functions according to principles of comparison rather than of compensation in making the measurements to which reference has been made, and I therefore call it an amplitude phase comparator.

An object of the invention is to provide apparatus and method whereby the amplitude of an unknown potential is measured by obtaining the ratio between an amplitude of an arbitrary standard potential and the amplitude to which said standard needs to be reduced in order to equal the amplitude of the unknown potential.

Another object of the invention is to provide apparatus and method whereby the angular phase difference of opposed electromotive forces is determined by comparing the actual phase displacement with the angular relationship in which the said forces are in balance.

Another object consists in providing such an apparatus and method which may be accommodated to varying physical conditions of the earth, and which will be efficient and accurate in disclosing the results that are the purpose of the exploration.

A further object consists in providing certain improvements in the form, construction and arrangement of the several parts, and in the steps followed, whereby the above named and other objects may effectively be obtained.

Generally speaking, my new amplitude phase comparator embodies a comparator network and a special indicator, which latter comprises a twin amplifier detector, arranged in combination with a galvanometer that is connected in bridge relationship to the output of the said amplifier. The principle or mode of operation adopted for both the amplitude and the phase determinations involves the application of an arbitrary standard and an unknown potential to the input of the twin amplifier detector. The amplitude of the standard potential is thereupon reduced by use of a network until it equals the amplitude of the unknown potential, which condition of equality may be indicated by zero deflection of the needle of a galvanometer. If the amplitude of the reduced standard potential be denoted by A, and the amplitude of the standard potential be S, then the ratio $A/S$ represents a measure of the amplitude of the unknown potential which may be evaluated accordingly.

An important feature of my invention resides in the fact that the numerical evaluation is not based upon inductive or capacitive impedance values but, on the other hand, is based upon amplitude relativity so that, to that extent, the evaluation is independent of the frequency of the two electromotive forces involved in the determination. Moreover, it should also be noted that variations in amplification and rectification values of the twin amplifier detector do not affect the final result, because each measurement may be preceded by an individual calibration which is especially designed to eliminate the effect of such variations upon the indicator unit.

A practical embodiment of apparatus according to my invention is diagrammatically represented in the accompanying drawing in which a source of energy 1, such, for instance, as an alternating electric current generator shown in the drawing or a device for the production of continuous mechanical vibrations shown in my U. S. Patent 2,202,885, issued June 4, 1940, is coupled by the electric, magnetic and mechanical properties of the intervening ground to two similar energy transfer elements denoted by 2 and 3. These last named elements may consist of any known or approved device adapted to cause a drop in potential of the electric current, or to accomplish the transfer of mechanical vibrations into an alternating electromotive force such, for instance, as search coils, transformers, contact pick-up devices suitable for the investigation of alternating electric and magnetic ground fields such as are used for geo-electric exploration purposes, and various kinds of pick-ups used for seismic exploration purposes including both direct and transformer coupled types, examples of the foregoing, many of which are well known and in general use in this art, being set forth in my said Patent No. 2,202,885 and in U. S. patent to Conrad Schlumberger, No. 2,191,119, issued February 20, 1940.

A potentiometer 4 is connected across energy transformer device 2, in series with an adjustable rheostat 5, although the connection may be direct, the insertion of the said rheostat into this circuit being rendered practicable by the provision of a double pole, three position switch 6. The second pole arm of said switch is adapted to insert a fixed resistor 7 in series with the energy transfer device 3 and a center tap potentiometer 8 that is electrically identical with potentiometer 4.

A single pole, double throw switch 9 is arranged to connect a suitable amplifier detector combination 10 either to the slider of potentiometer 4, or to the center tap of potentiometer 8; while a single pole, double throw switch 11 is fitted to connect the right hand outside contact of a triple pole, double throw switch 12 either to the slider of potentiometer 8 or to the slider of potentiometer 4. The right outside pole of switch 12 can connect a second amplifier detector combination 13 either to the center tap of potentiometer 8, or to the slider of either potentiometer 4 or 8 according to the thrown position of switch arm 11.

The left hand arm of switch 12 is adapted to connect the common point 14 of the two amplifier detector combinations 10 and 13 with either end of the potentiometer 8; and the center arm of said switch 12 may connect the right hand end of potentiometer 4 either to the right hand end or to the center tap of potentiometer 8. The layout of the apparatus is completed by connecting the common output 15 of the two amplifier detector combinations 10 and 13, in bridge relationship, to an output potentiometer 16 that is, in turn, connected with a galvanometer 17 which is preferably of the d'Arsonval type.

The two amplifier detector combinations 10 and 13 may be of any well known or approved form that is suitable for the amplification and rectification of continuous alternating current impulses, but in any case the two said units or combinations should be electrically identical.

In operation, assuming the apparatus to be set up as above described and an alternating electric current to be generated at the source of energy 1, the operator will first move switches 6 and 12 to the left and switch 9 to the right. This arrangement will connect the potential that is acting between the center tap and the right side of potentiometer 8, to both of the amplifier detector combinations 10 and 13. If it should be that the then electric characteristics of the two said combinations are alike, their output should also be alike and fail to cause any deflection of the needle of the output galvanometer 17. However, such a condition is not likely to exist and, in order to obtain a zero deflection of the galvanometer needle, it will usually be necessary to adjust the slider of the output potentiometer 16 until a balance is produced. This operation I refer to as the ratio 1 balancing of the comparator apparatus. The succeeding step, which I call the ratio 1 determination of the comparator apparatus, involves simply the throwing of switch 9 to the left, and thereafter adjusting the slider of potentiometer 4 until the needle on galvanometer 17, which has been deflected by the said movement of switch 9, is returned to zero as an indication that balance in the output currents has been reestablished. In this condition, the potential between the right end and the slider of potentiometer 4 equals the potential between the right end and center tap of potentiometer 8, which fact may be availed of to establish a mathematical relationship between the two potentials that are thus impressed across the two potentiometers 4 and 8.

In order to complete the measuring of the amplitude ratio, switch 6 is moved to its center position and switch 9 turned again to the right. The potential which thereupon exists between the center tap and the right hand end of potentiometer 8 is again impressed upon the two amplifier detector combinations 10 and 13 and, if necessary, the galvanometer is rebalanced to zero deflection by adjusting the slider of output potentiometer 16. Following this operation, which I call the ratio 2 balancing, one may proceed to what I call the ratio 2 determination, which consists in throwing switch 6 from its center position to its right hand position, throwing switch 9 back to its left hand position and, without changing the position of the slider on potentiometer 4, adjusting the rheostat 5 until the consequent deflection of the galvanometer needle is reduced to zero. This last named adjustment leads to the establishing of another mathematical relationship between the electromotive force outputs of the energy transfer devices 2 and 3, and may be utilized for the purpose of computing this relationship or ratio in the form of numerical values.

It is possible now to proceed to measurement of the phase relationship of the electromotive force outputs of the energy transfer devices 2 and 3, and, for the purpose of this investigation, switch 6 is moved to the left, switch 9 permitted to remain in its left hand position, switch 12 moved to the right, and switch 11 also moved to the right. This setup will connect the voltage existing between the left hand end and the center tap of potentiometer 8, in series opposition with the voltage occurring between the right hand end and the slider of potentiometer 4.

If it be assumed that the value of the potentials set up by energy transfer devices 2 and 3 remain the same, and that the position of the slider of potentiometer 4 is unchanged, then the amplitude of the voltages which have been thus connected in opposition must be identical, and the value of the resultant differential voltage will be zero provided that the two voltages involved are in a phase displacement of precisely 180°. In case the said phase displacement is not exactly 180°, the two said voltages will not completely nullify each other, and hence there will be produced a certain resultant differential in electromotive force applied to both the amplifier detector combinations 10 and 13. This differential is then eliminated by balancing the output of the two said combinations. This balance is accomplished by suitable adjustment of the slider of potentiometer 16 until zero reading of the meter is obtained.

The operation just described, which I call phase balancing, prepares the apparatus for the final step of phase determination, and one proceeds to this latter result without changing the setting of potentiometer 4 and 16, or the position of switches 6, 9 and 12, but by moving switch 11 to the left and reducing to zero any existing deflection of the galvanometer needle by adjusting the slider of potentiometer 8. Then, the drop which has thus been occasioned in the potential between the left end and the slider of potentiometer 8, represents a measure of the phase difference of the two opposed voltages above named. If this phase difference is 180°, the slider of potentiometer 8 should be located at its left end, while a zero degree phase difference will permit the attainment of balance only by moving its slider to the right hand end of potentiometer 8.

For the purpose of providing mathematical expressions to cover the various measuring operations hereinabove described, I have selected the following abbreviations:

$e_2$, $p_2$ represent potential amplitude and phase value of the induced E. M. F. of device 2.
$e_3$, $p_3$ represent potential amplitude and phase value of the induced E. M. F. of device 3.
X represents impedance of circuit 2, 4, 6.
Y represents impedance of circuit 3, 8, 6.
$e_4$, $p_4$ represent amplitude and phase value of the potential between slider and right hand end of potentiometer 4.
$a$ represents value of resistance between slider and right hand end of potentiometer 4.
$b$ represents the resistance of potentiometer 4 which is identical with one-half the resistance of potentiometer 8.
$e_8$, $p_8$ represent amplitude and phase value of the potential between center tap and either end of potentiometer 8.
$e_0$, $p_0$ represent amplitude and phase of potential between slider and left hand end of potentiometer 8.
$c$ represents value of resistance between slider and left hand end of potentiometer 8.
$r_5$ represents value of adjustable rheostat 5.
$r_7$ represents value of fixed resistor 7.

Considering now ratio 1 determination, the potentials established by the described operation touching this determination may be set forth by the following equations:

(1) $\quad e_4(\sin p_4 - j \cos p_4) = e_2 \dfrac{a}{X}(\sin p_2 - j \cos p_2)$ (2) $\quad e_8(\sin p_8 - j \cos p_8) = e_3 \dfrac{b}{Y}(\sin p_3 - j \cos p_3)$ In view of the fact that, as previously indicated, the ratio 1 determination relates to amplitude values only, the following simple equation is valid:

$$e_4 = e_8$$

or $$e_2 \frac{a}{X} = e_3 \frac{b}{Y}$$

which solves to $$\frac{e_3}{e_2} = \frac{a}{b} \times \frac{Y}{X}$$

or by substituting $$\frac{a}{b} = R_1 \text{ and } \frac{Y}{X} = R_2$$

(3) $\quad \dfrac{e_3}{e_2} = R_1 \times R_2$

In the equation last set forth, $R_1$ is a known quantity, while $R_2$ may be ascertained by the ratio 2 determination, which, as hereinabove described, involves the insertion of a resistor of known value $r_7$ into the circuit 3, 8, 6, and the balancing of the galvanometer by adjusting rheostat 5 that is in circuit 2, 4, 6. This last named operation establishes a second equation for the unknown quantity or ratio $R_2$, and this makes possible the determination of the impedance ratio $R_2$, as follows:

$$R_2 = \frac{Y + r_7}{X + r_5}$$

In order to make a numerical computation of the impedance ratio $R_2$, the equation just established is combined with the above noted expression $$R_2 = \frac{Y}{X}$$

to form the following equation:

(4) $\quad R_2 = \dfrac{r_7}{r_5}$

From the foregoing it is obvious that, in case the two impedances X and Y are identical, the value of $R_2$ reduces to 1 and its determination may therefore be omitted. In such case Equation 3 above simplifies itself to $$\frac{e_3}{e_2} = R_1$$

Proceeding now to the analysis of the phase determination, the impedances X and Y are complex quantities characterized by the amplitude values $x$ and $y$, and the phase values $p_x$ and $p_y$. Taking this fact into consideration, Equations 1 and 2 may be written in the form:

(5)
$$e_4(\sin p_4 - j \cos p_4) = e_2 \frac{a}{x}[\cos (p_2 - p_x) - j \sin (p_2 - p_x)]$$

(6)
$$e_8(\sin p_8 - j \cos p_8) = e_3 \frac{b}{y}[\cos (p_3 - p_y) - j \sin (p_3 - p_y)]$$

As far as the final outcome of the measurement is concerned, the only factors which could cause variations in phase are connected with the voltages picked up by the energy transfer devices 2 and 3, while the impedance values referred to in the preceding determination can be safely disregarded because they represent ohmic resistances only. Hence, the phase determination itself is properly described by the equation:

(7) $\quad e_0(\sin p_0 - j \cos p_0) = e_4(\sin p_4 - j \cos p_4) - e_8(\sin p_8 - j \cos p_8)$ and, by substituting Equations 5 and 6, Equation 7 solves to:

(8) $\quad e_0^2 = \left(e_2 \dfrac{a}{x}\right)^2 + \left(e_3 \dfrac{b}{y}\right)^2 -$
$$2 e_2 \frac{a}{x} e_3 \frac{b}{y} \cos [(p_2 - p_x) - (p_3 - p_y)]$$

Finally, through substitution of $$e_0^2 = \left(e_3 \frac{c}{y}\right)^2 \text{ and } \frac{c}{b} = R_3$$

this last equation may be written:

(9) $\quad R_3^2 = R_2^2 + 1 - 2R_2 \cos [(p_2 - p_x) - (p_3 - p_y)]$ or

(10) $\quad \cos [(p_2 - p_3) - (p_x - p_y)] = \dfrac{1 + r_2^2 - r_3^2}{2 r_2}$ It will be noted that this final equation does not contain the amplitude ratio $R_1$. For identical impedances where $x = y$, $p_x = p_y$, the cosine expression simplifies to

(11) $\quad \cos (p_2 - p_3) = 1 - \dfrac{R_3^2}{2}$

While most measurements may be arranged on this basis, it still may be necessary to determine the phase difference $p_x - p_y$ either as an instrument constant or to provide for its determination by means of auxiliary apparatus well known to the art such, for instance, as alternating current bridges or compensators, whenever such determination is required.

Study of the apparatus hereinabove described reveals the fact that the various measurements set forth do not require any knowledge of the frequency of the electromotive forces that are being compared, provided that identical impedance values are used in the two chief measuring circuits 2, 4, 6 and 3, 8, 6. This fact is of particular importance and advantage in cases, which often arise, where it is difficult to make accurate frequency or phase determinations such, for instance, as in applications involving the use of electromotive forces of low frequency. It will also be noted that the hereinabove described procedure for phase determination is comparatively simple and yet accurate, eliminating the necessity of utilizing phase shifting devices and depending primarily upon the phenomena that are connected with the superposition or addition of two sine or cosine functions.

The determination of the foregoing relationships is of particular advantage and utility in geophysical investigations using either electric or seismic methods, both of which may be based upon the procedure hereinabove described. It is well understood by those versed in this art how the desired information may be obtained by interpretation of the data or relationship established or disclosed through use of my apparatus and method.

In other words, one skilled in this art will readily be advised from the results of the above outlined procedure as to the presence of geological disturbances or nonuniformity within the field being investigated which are indicative of the presence or absence of mineral deposits in search of which the investigation or exploration is being conducted. The determinations arising from the above procedure are not quantitative nor directly indicative of the character of deposits, but they accurately advise the investigator skilled in this art as to existing conditions which form the basis of conclusions as to the presence or absence of such deposits.

There are other advantages inherent in the apparatus and method, and I desire it to be understood that various changes may be resorted to in the form, construction, material, and arrangement of the several parts, as well as in the steps of the method followed and the order thereof, without departing from the spirit and scope of my invention. Hence, I do not intend to be limited to the details hereinabove set forth except as they may be included in the claims.

What I claim is:

1. Apparatus for determining the amplitude ratio and phase difference of sine wave electromotive forces of the same frequency comprising, a plurality of sources of electrical waves of the same frequency which may differ in amplitude and phase, a non-reactive resistance network constructed and arranged to measure amplitude and phase comprising a plurality of non-reactive electrical impedances connected in series, respectively, with said sources, a plurality of similar electrical amplifiers connected in circuit with said impedances, and an indicating device connected in bridge relationship with said amplifiers.

2. Apparatus for determining the amplitude ratio and phase difference of sine wave electromotive forces of the same frequency comprising, a plurality of sources of electrical waves of the same frequency which may differ in amplitude and phase, a non-reactive resistance network constructed and arranged to measure amplitude and phase comprising a plurality of straight electrical resistances connected in series, respectively, with said sources, a plurality of similar electrical amplifiers connected in circuit with said resistances, and an indicating device connected in bridge relationship with said amplifiers.

3. Apparatus for determining the amplitude ratio and phase difference of sine wave electromotive forces of the same frequency comprising, a plurality of sources of electrical waves of the same frequency which may differ in amplitude and phase, a non-reactive resistance network constructed and arranged to measure amplitude and phase comprising a plurality of non-reactive electrical impedances connected in series, respectively, with said sources, a plurality of similar electrical amplifiers connected in circuit with said impedances, and a direct reading indicating device connected in bridge relationship with said amplifiers.

4. Apparatus for determining the amplitude ratio and phase difference of sine wave electromotive forces of the same frequency comprising, a plurality of sources of electrical waves of the same frequency which may differ in amplitude and phase, a non-reactive resistance network constructed and arranged to measure amplitude and phase comprising a plurality of straight electrical resistances connected in series, respectively, with said sources, a plurality of similar electrical amplifiers connected in circuit with said resistances, and a direct reading indicating device connected in bridge relationship with said amplifiers.

THEODOR ZUSCHLAG.